United States Patent [19]

Waters

[11] 3,714,621
[45] Jan. 30, 1973

[54] METHOD AND APPARATUS FOR SEISMIC GAIN CONTROL THROUGH SEISMIC SIGNAL COHERENCE

[75] Inventor: Kenneth H. Waters, Ponca City, Okla.

[73] Assignee: Continental Oil Company, Ponca City, Okla.

[22] Filed: Dec. 30, 1970

[21] Appl. No.: 102,729

[52] U.S. Cl..................................340/15.5 TC
   340/15.5 CC, 340/15.5 SC,
   340/15.5 CP, 324/77 G, 324/77 H, 235/181
[51] Int. Cl..............................................G01v 1/28
[58] Field of Search .340/15.5 CC, 15.5 SC, 15.5 CP, 340/15.5 TC; 324/77 G, 77 H; 235/181

[56] References Cited

UNITED STATES PATENTS

| | | | |
|---|---|---|---|
| 3,496,529 | 2/1970 | Anstey et al. | 340/15.5 CC |
| 3,539,985 | 11/1970 | Schneider et al. | 340/15.5 CP |
| 3,496,531 | 2/1970 | Sullivan et al. | 340/15.5 CC |

Primary Examiner—Benjamin A. Borchelt
Assistant Examiner—N. Moskowitz
Attorney—Joseph C. Kotarski, Henry H. Huth, Robert B. Coleman, Jr., William J. Miller, David H. Hill and Craig, Antonelli, Stewart and Hill

[57] ABSTRACT

The method consists of deriving a coherence measure from selected related traces of a seismic cross-section, and thereafter weighting individual or selected ones of the seismic traces in accordance with such time-analogue coherence quotient. Apparatus for carrying out the method may consist of structure for imposing predetermined delay between each pair of a group of selected seismic traces with subsequent summation, multiplication and integration over a time period to provide a first integrated output; and each trace pair is then subjected to one or more other predetermined, different delays with respective outputs applied to the multiplier and integrator circuitry thereby to generate additional integrated outputs. All integrated outputs for each trace pair are then applied through sample and hold circuitry to select a time-varying maximum voltage signal for output as a coherence quotient signal. Thereafter, the coherence quotient signals for each trace pair are combined to form a signal of time-varying character which is employed to control signal gain through duration of selected seismic trace signals thereby to selectively allow passage or to suppress in varying degrees the final output signal indications.

8 Claims, 7 Drawing Figures

METHOD AND APPARATUS FOR SEISMIC GAIN CONTROL THROUGH SEISMIC SIGNAL COHERENCE

BACKGROUND OF THE INVENTION

1. Field of the Invention

The invention relates generally to seismic energy signal processing and, more particularly, but not by way of limitation, it relates to improved processing of seismic cross-section indications and enhancement of certain data through utilization of a derived coherence measure related to all traces of the section.

2. Description of the Prior Art

The prior art includes teaching of various types of signal processing techniques which act upon a group of seismic traces to derive trace information having specifically accentuated parameters of trace information output in the output or display format. One of the forerunner processes in the related type of group trace processing is disclosed in U.S. Pat. No. 3,496,531 in the name of Sullivan et al. as assigned to the common assignee. The Sullivan et al. teachings disclose what is now known as the Mean-Differential-Summation (MDS) technique for deriving and applying a gain function in predetermined manner to a group of related seismic traces. Still other process and apparatus is directed to various forms of processing for enhancement and/or attenuation of certain seismic event parameters for the purpose of delineating desired coherence factors, seismic signal velocity characteristics and relationships, as well as various other inverse filtering and time domain filtering processing techniques. The present invention is utilized for enhancing signal information of a particular type, i.e., determination of a group trace coherence through correlation of selected trace-to-trace relationships and time windows to develop a time-gain function for controlling final output of selected traces of a seismic cross-section.

SUMMARY OF THE INVENTION

The present invention contemplates method and apparatus for deriving a coherence factor through comparison of a plurality of selected trace pairs of the related trace cross-section, each of such trace pair examinations being effected at each of a plurality of different time delay relationships, with final summation and derivation of maximum voltage outputs for each trace pair then combined to compose a time-varying amplitude indication for application as time-varying gain control to selected individual traces or trace groups making up the seismic cross-section; such a coherence factor signal serves to reduce amplitude when group coherence is low and to exert little or no effect when group coherence is high.

Therefore, it is an object of the present invention to provide method and apparatus for derivation of a group trace coherence factor.

It is also an object of the invention to provide a seismic processing method and apparatus for enabling greater clarity and more readily identifiable signal indication of certain dipping events.

It is still further an object of the present invention to provide a method for aiding in determination of a statistical measure of seismic energy velocity.

Finally, it is an object of the present invention to provide method and apparatus for obviating some of the problems caused by poorly recorded traces and/or traces which are incoherent for other than usual geological reasons.

Other objects and advantages of the invention will be evident from the following detailed description when read in conjunction with the accompanying drawings which illustrate the invention.

BRIEF DESCRIPTION OF THE DRAWINGS

FIG. 4 is a functional block diagram illustrating the general method of the invention.

FIG. 6 is a seismic trace cross-section in original form; and

DETAILED DESCRIPTION OF THE INVENTION

Figure 1:
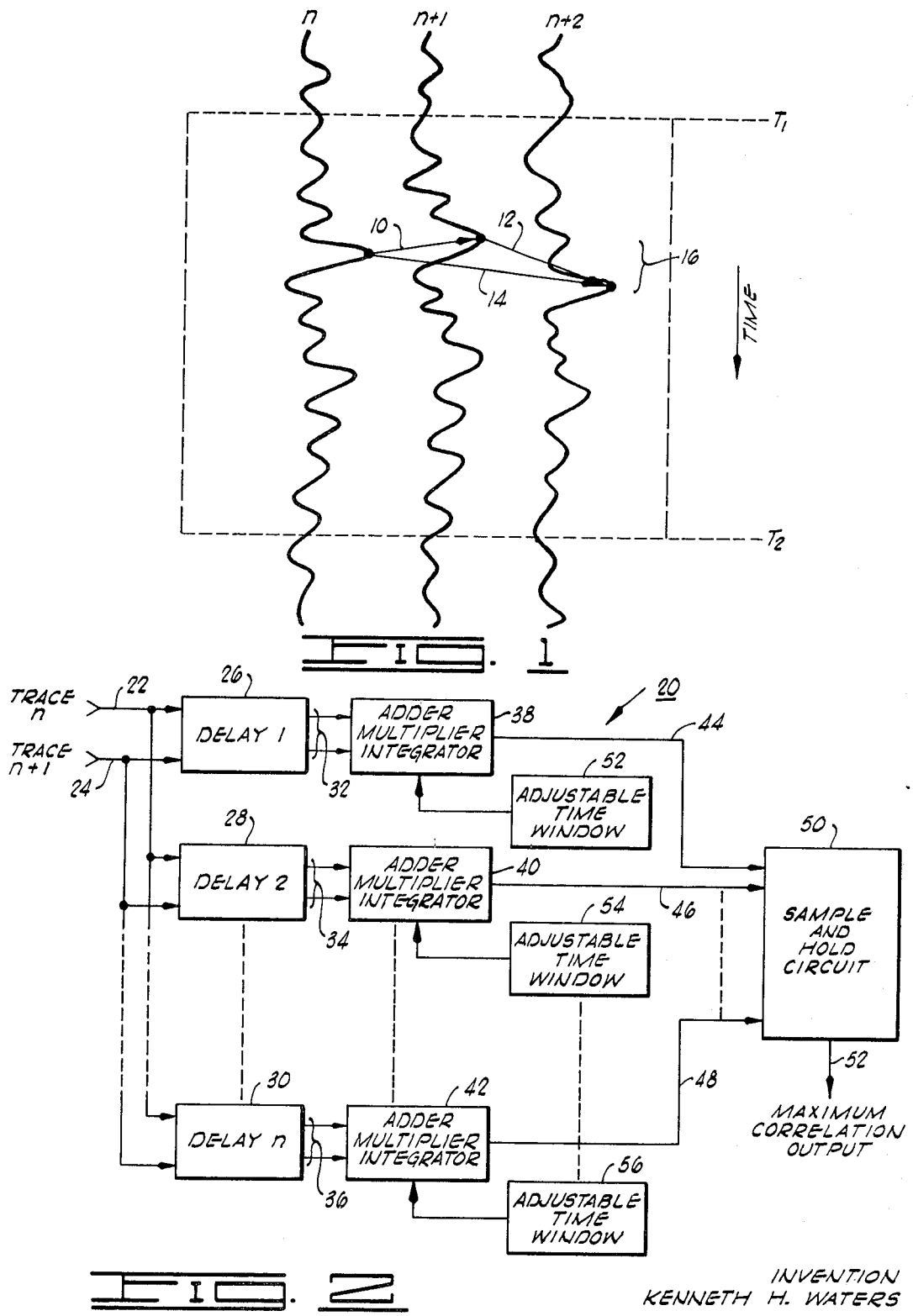
FIG. 1 is a schematic representation of idealized seismic traces illustrating a predetermined trace relationship within a specific time window.

The present disclosure teaches the use of coherence as one parameter of interest relative to a seismic cross-section. It is now apparent that low coherence of identifiable events between seismic traces can come about through at least two different mechanisms. First, a low coherence characteristic may be caused by a high random noise level as has been conventionally understood. Second, a low coherence may come about since the signal handling process is forced to look at a piece of the cross-section which is of finite size. Within this finite piece, the events may not be parallel and, if this is the case, the cross-correlations between the present traces are deteriorated and enable only low coherence detection. With recognition of this second form of incoherence, the present invention exposes the possibility of detecting certain subsurface anomalies and structures which are different geological situations from those normally implied from random noise.

Processing in accordance with this invention enables searching for maximum cross-correlation coefficient regardless of dip, i.e., within reasonable bounds, and the process does not require that the seismic traces be properly corrected for weathering and elevation effects. This is, therefore, a different approach to the coherence factor derivation from that taken by the mean-differential-summation technique as taught in the aforementioned U.S. Pat. No. 3,496,531, wherein static corrections must be accurately inserted to the data in order to avoid appreciable downgrading in the quality of the reflection information.

The present process may be applied to such as a seismic cross-section which consists of seismic traces showing reflections and other events recorded at different points along a survey line on the surface of the earth. Such a seismic cross-section will show reflections as "line-ups" of the events on consecutive traces. At certain points on the cross-section, however, there are areas where there appears to be no preferred direction of line-up of the events, apparently meaningless trace energies which appear to be coming in at random. In such areas, the similarity or coherence from trace-to-trace is relatively poor; whereas in reflection areas, the line-ups will be relatively good with high coherence of event consistency from trace-to-trace. The trace-to-trace coherence may be measured as the maximum of the cross-correlation function divided by the square root of the product of the autocorrelation function values at zero trace shift of the consecutive traces of data. Such a relationship may be designated as $$C_{12} = \max \frac{\phi_{12}(\tau)}{(\phi_{11}(0)\phi_{22}(0))^{1/2}} \quad (1)$$

where $C$ equals coherence coefficient, $\phi$ equals a cross-correlation value, and $\tau$ equals the time delay between adjacent traces.

Thus, in the above equation, cross-correlation is carried out to derive similarity between two traces, trace 1 and trace 2, which factor may be designated $\phi_{12}$, and cross-correlation value which is also dependent upon amplitude. In order to remove the amplitude dependence, the quantity $\phi_{12}$ is divided by the square root of the autocorrelation factor of the product of each of trace 1 and trace 2, i.e. the divisor quantity of equation (1). Actually, one of the curves from trace 1 or trace 2 may be shifted in time due to variable weathering, offset, etc., and the maximum of trace coherence between any two traces will depend upon the dip existing between traces, this may vary between certain pre-set time delay limits, as will be further described below.

Group coherence and analysis between a plurality of consecutive traces is carried out by effecting a permutation of separate dual trace comparisons. That is, each trace may be compared for coherence with every other trace in the trace group, i.e., cross-correlation at selected time delays would be carried out with respect to trace 1 – trace 2, trace 1 – trace 3, trace 1 – trace 4, etc.; and a next group of trace comparisons would consists of trace 2 – trace 3, trace 2 – trace 4, trace 3 – trace 4, and so on. It may be that such permutation is carried out until all possible trace pairs are cross-correlated for contribution to the overall group coherence factor; however, initial examination of the data may indicate that only a limited number of trace pairs need be examined through cross-correlation. Further, the process may make allowance for the distance apart of the trace samples, such that weighting factors may also be applied in compiling the group coherence coefficient.

Individual trace-to-trace coherences may be low due to the possibility that one of the traces was recorded incorrectly. The concept of the group coherence then makes it possible to minimize effects of such poorly recorded individual traces. In general, it can be regarded as any function (F) of the individual coherences between all pairs of the group $$G_m{}^n = F(C_{ij}) \quad (2)$$

where $G_m{}^n$ equals group coherence between traces numbered $m$ through $n$, $i$ equals $m(1)n$, $j$ equals $m(1)n$, and $i$ is not equal to $j$.

Particular functions, such as the arithmetic or the geometrical means, may be used for particular applications. For example, and for purposes of description only, the arithmetic mean factor may be used; that is, $$G_m{}^n = E\{C_{ij}\} \quad (3)$$

where the $E$ function represents the expected value or arithmetic mean. Thus, in referring to FIG. 1, for any time zone $T_1$–$T_2$, for any group of traces $n$, $n+1$, $n+2$, etc. within the bounds of the cross-section, a group coherence can be assigned. The present process serves to determine these coherences for the purpose of deriving a superimposed gain (as a function of time and trace number) so that the seismic signals of the cross-section or any normalized or CDP processed group of such signals, will be reduced in amplitude when the group coherence is low and left alone when the group coherence is high.

The time window of FIG. 1 between $T_1$ and $T_2$ discloses a possible event apparent on each of traces $n$, $n+1$ and $n+2$. Thus, cross-correlation of trace $n$ and trace $n+1$ will prove reduced coherence due to the fact that an event on trace $n$ occurs at slightly less time than the related event on the adjacent trace $n+1$, as shown by arrow 10. The event relationship between trace $n+1$ and trace $n+2$ is still further incoherent due to an increased delay time between the event occuring on trace $n+2$ and the prior occuring event on trace $n+1$, as denoted by arrow 12. The arrow 14 denotes still another time differential relationship as between events on trace $n$ and trace $n+2$. Such coherence determinations made, in a manner as will be further described, with respect to each of the relationships 10, 12 and 14 with final combination to an overall group coherence factor, enables derivation of an AGC type of signal which can then serve to control a related time-varying seismic signal in accordance therewith.

It is readily apparent from the examination of the curves $n$ through $n+2$ of FIG. 1 that a direct or undelayed summation or processing combination of the traces would result in a diminishment of any meaningful signal output within the time or event area 16. However, by repeated cross-correlations of selected pairs of traces at each of a plurality of different time delay relationships a peak signal indication will be obtained. Thereafter, each of the peak signal indications from each of the trace pair processes is further combined as by (for example) arithmetic or geometric summation to develop a final process control signal indicative of group coherence.

While the group coherence indicated by equation (3) above utilizes an expected value or arithmetic mean, i.e., the quantity E and function standing for arithmetic mean value, or other more complex functions having the general bounds zero to one may be used for special purposes. Thus, final output gain in accordance with group coherence may be determined as a function of such as $$\gamma_m{}^n = (G_m{}^n)^2 \quad (4)$$

$$\gamma_m{}^u = 1 - (1/G_m{}^n) \quad (5)$$

$$\gamma_m{}^n = 1 - [1/(G_m{}^n)^p] \quad (6)$$

where each of the respective functions enables a specific coherence quotient. Since the group coherence applies to a specific group of traces, and over a certain time zone, it is the usual practice to calculate the gain and use it on the center trace of the group. However, it should be understood that the gain factor can be applied to any particular trace as selected or designated within the trace group, and this is especially necessary when the process deals with an even number of traces.

Figure 2:
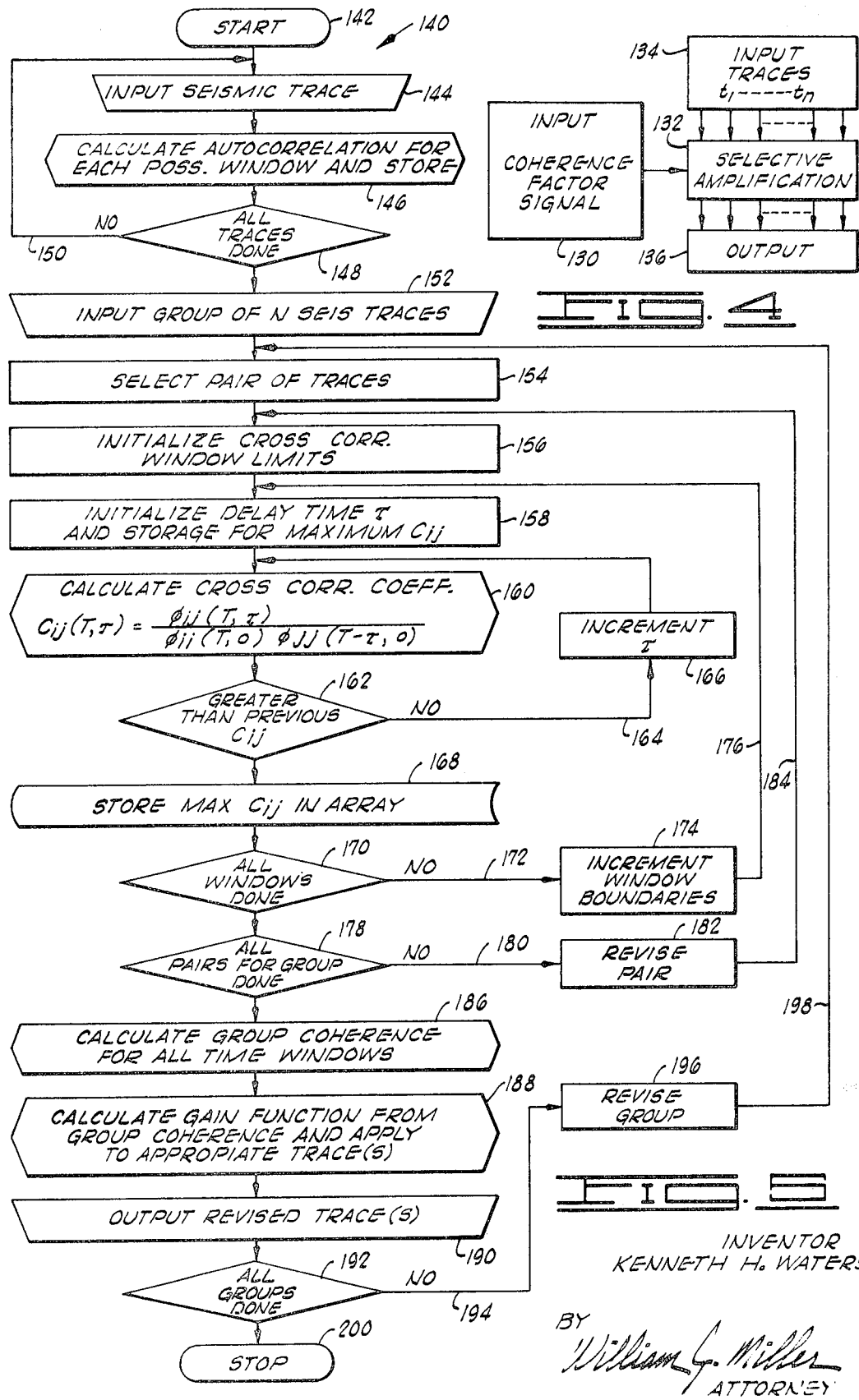
FIG. 2 is a block diagram illustrating one form of trace pair coherence circuitry as may be utilized in the present invention.

FIG. 2 illustrates a trace pair coherence circuit 20 which is suitable for carrying out the method of the invention. Thus, a pair of related traces $n$ and $n+1$ are input at leads 22 and 24 for parallel application to each of a plurality of delays 1 through $n$, time delay stages 26, 28 and 30. The number and time delay variation as between delay stages 26–30, and other interim stages as required by the particular processing and data exigencies, is set in accordance with known factors and other empirical data derived for the particular terrain and shot sequence. The delay stages 26–30 may be the well-known form of recorder delay stages as often utilized in seismic processing work or, other of the more recently developed semiconductive and/or acoustic time delay devices may be utilized.

Time delayed trace signal outputs on respective ones of lead pairs 32, 34 and 36 are then applied to respective adder-multiplier-integrator combining circuits 38, 40 and 42. Each of the combining circuits 38–42 may consist of a well known summation network receiving the trace pair inputs for summing to form a single signal which is then amplified through a multiplier, e.g., a standard form of operational amplifier; and, finally, the multiplier circuit output is applied through a suitable integration network for signal integration in accordance with a pre-determined time factor. Output from the integrator, i.e., combining circuits 38–42, is then applied via leads 44, 46 and 48 to a sample and hold circuit 50. Integration in each of the combining circuits 38–42 proceeds through a pre-set time as set through adjustable time window circuits 52, 54 and 56 which serve to control or gate the time period of operation for each of the respective integrator circuits within combining circuits 38, 40 and 42.

The sample and hold circuit 50 receives inputs from each of leads 44, 46 and 48, such inputs consisting of the trace pair coherence signal for a specific time delay. Sample and hold circuit 50 than retains the trace pair coherence signal values over a period equatable to a selected time window length such that, in effect, sample and hold circuit 50 serves as a maximum voltage selector for trace values related to the trace pair $n$, $n+1$. The sample and hold circuit 50 may be any conventional form of sample and hold circuitry, e.g., the conventional parallel-diode array operating in conjunction with a storage capacitor. Output from the sample and hold circuit 50 is then provided via a lead 52 for application to further processing circuitry as will be further described below.

Figure 3:
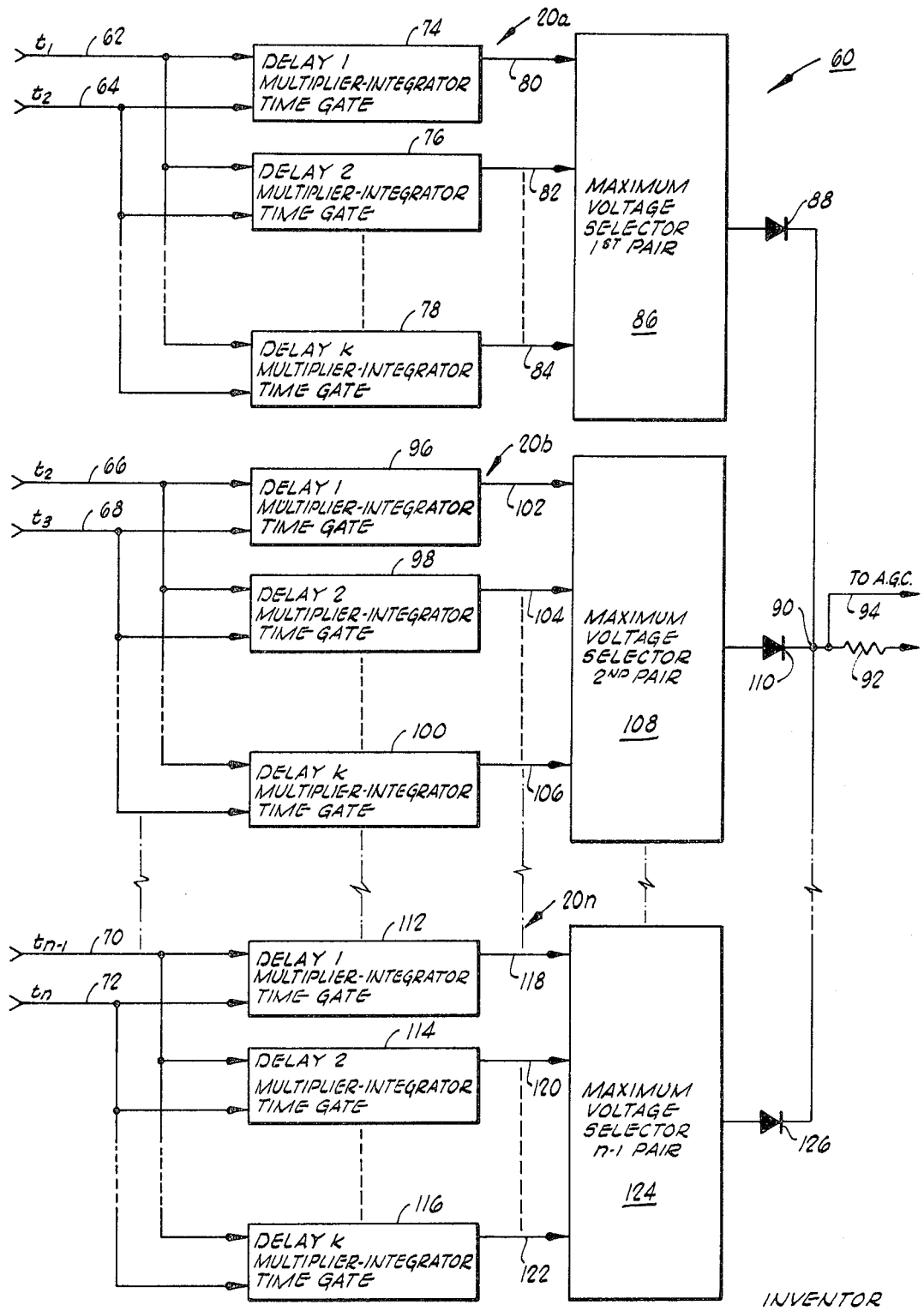
FIG. 3 is a block diagram of coherence factor circuitry for processing a plurality of seismic traces as may be utilized in the present invention.

As shown in FIG. 3, coherence factor circuitry 60 consists of a parallel array of a plurality of trace pair coherence circuits 20a, 20b through 20n, each receiving separate trace pair input information. Thus, as derived from a given array of related traces, e.g., a selected seismic cross-section, traces $t_1$ and $t_2$ are applied via leads 62 and 64 for input to coherence circuit 20a. Similarly, traces $t_2$ and $t_3$ are applied via lead 66 and 68 to coherence circuitry 20b and so on through input of traces $t_n-1$ and $t_n$ as input via respective leads 70 and 72 to the final coherence circuitry 20n. As previously stated it is often desirable to permutate as to all possible pairs for input to coherence factor circuitry 60.

Each of the coherence circuits 20a through 20n is essentially the same as coherence circuit 20 in FIG. 2. That is, with attention directed to coherence circuitry 20a, the inputs 62 and 64 are applied in parallel to each of a plurality of delay-combining circuits 74, 76 and 78. Each of the delay-combining circuits 74 through 78 serves to impose a pre-set, different time delay between input traces $t_1$ and $t_2$ whereupon the delay trace signals are combined, either additively or by other selected function, for subsequent multiplier amplification and signal integration over a selected time window, as set by the time gate portion of the circuit.

Each of the delays 1 through $k$ is set at some different trace time difference over a range as determined by empirical data and other operator observations. Outputs from the delay-combining circuits 74 through 78 are then applied via leads 80, 82 and 84 for input to a maximum voltage selector circuit 86, e.g., a suitable form of sample and hold circuit, as described with respect to the FIG. 2 structure. The maximum voltage selector 86 receives the plurality of integrated, differently time-delayed, trace coherence signals to derive a maximum voltage for output through a diode 88 to a junction 90 and further processing output 92. An output lead 94 from junction 90 provides an AGC type signal which can be used to control the gain of a selected seismic trace signal as a function of time thereby to accentuate certain event signals while allowing other event signals of stronger and more definite character to pass in original or unaltered strength.

Other trace pairs of the selected trace group must also be processed in similar manner to derive a coherence signal for combination into the final coherence factor output. Thus, trace signal input for traces $t_2$ and $t_3$ are applied via leads 66 and 68 to respective delay-combining circuits 96, 98 and 100, and respective outputs are generated on leads 102, 104 and 106 for input to a maximum voltage selector circuit 108. The output from maximum voltage selector circuit 108 is then applied through a diode 110 to be present at junction point 90 in the output.

Similar circuitry will be used to treat selected ones or all of the various trace pair combinations within the trace group, with final analysis of the trace pair consisting of traces $t_{n-1}$ and $t_n$ as input via leads 70 and 72 to respective delay-combining circuits 112, 114 and 116. Each of the delay-combining circuits 112 through 116 provides an output on respective leads 118, 120 and 122 for input to a maximum voltage selector circuit 124 which, in turn, provides a coherence output signal through a diode rectifier 126 to the output signal terminal 90 and later processing stages.

From output junction point 90, a current limited output on lead 92 may be applied for still further signal processing of the group coherence factor signal to further refine or define the limits and useability of the signal. A direct output via lead 94 may be applied to control time-versus-amplitude output of a selected one of the trace signals $t_1$ through $t_n$ to weight the signal amplification in accordance with the determined coherence. Such an amplitude-time control signal may also be utilized to enhance signal content of a plurality of pre-process signals.

FIG. 4 illustrates the basic method wherein a derived coherence factor at an input stage 130 is applied to control a selective amplification bank 132 which receives one or more input traces $t_1$ to $t_n$. The selectively amplified out trace signals are then conducted to output 136 for further processing, display or such.

For example, a selected plurality or even all of the traces $t_1$ through $t_n$ may be combined, correlated, added with velocity constraints, combined at pre-determined off-set time delays, or any of many other signal handling processes, whereupon the output coherence factor signal on lead 94 could be applied at any stage as a gain factor relative to such output.

The usefulness of the process of the invention becomes evident when it is recognized that breaks in continuity or parallelism of sub-surface reflections can greatly reduce the signal coherence, and application of the present process provides a means for emphasizing such vague areas on the seismic cross-section. The process enables a tool for promoting recognition of geological happenings which may be related to the occurrence of petroleum, i.e., such geological features or factors such as faults, thick shale zones, truncations or unconformities, etc.

The method of the present invention is also carried out as a machine process by digital electronic data processing apparatus programmed to carry out the various data sorting and subroutine operations in controlled manner. In the digital process, it is first necessary to calculate the coherence of a selected pair of traces over a given time zone. Thus, a cross-correlation as a function of shift $\tau$ is calculated by the sum of the cross products of the individual values of traces $t_1$ and $t_2$ over the length of the time window, as selected to be a certain time length. This procedure is done for all dips or all different time delays between selected plus and minus $\Delta t$ per trace intervals. The various values relating to the cross-correlation function are then stored.

In order to find the maximum cross-correlation coefficient, and thus the trace-to-trace coherence, the cross-correlation coefficients must be divided by the appropriate autocorrelation values, i.e., autocorrelation values derived at zero time shift but as centered on the proper time window center reference point. Thus a cross-correlation coefficient at time delay $\tau$ may be given by $$C_{12}(T, \tau) = \frac{\phi_{12}(T, \tau)}{[\phi_{11}(T, 0)\phi_{22}(T-\tau, 0)]^{1/2}} \quad (7)$$

where $T$ equals time at the center of the correlation time window, $\tau$ equals the time delay between a selected two trace window centers, $C$ equals the cross-correlation coefficient and $\phi$ equals an autocorrelation coefficient. Since the maximum of the cross-correlation coefficient is used the equation becomes $$\text{Max } C_{12}(T, \tau) = C_{12}(T) = \frac{\phi_{12}(T, \tau_m)}{[\phi_{11}(T, 0)\phi_{22}(T-\tau_m, 0)]^{1/2}} \quad (8)$$

where $\tau_m$ is the delay between the traces which makes $C_{12}(T)$ a maximum value. It may be regarded as an estimate seismic dip between the selected two traces in the vicinity of time $T$. It is an estimate only since the traces are digitized and $\tau$ is not continuous but must take on discrete values.

In the program, the values of the maximum correlation coefficients or coherences are stored as a function of the reference time $T$ in a CRCO matrix, i.e., a matrix representing cross-correlation coefficient array of 2,250 floating point numbers (15 × 150). The CRCO matrix is large enough to hold all of the pairs of six traces and 150 separate values of $T$, which at 0.040 second intervals is equivalent to 6 seconds of record time. Thus, the interval of $T$ is effectively not less than 0.040 seconds.

Since the value of $\tau_m$ is never known beforehand, the autocorrelation peaks for all possible digital times for all traces are needed. These are, therefore, calculated initially and stored in the associated external disc work storage for ready reference. These autocorrelation peak values will be a series of numbers only slightly less than the length of the traces, but they will occupy one full word each in storage due to the fact that they are "unpacked." The present digital processing program is utilized with a Sigma 7 computer of standard and commercially available type; thus, the maximum autocorrelation trace storage will be 1,500 words or 24 sectors of 64 words. Some sectors are used for processing systems storage with the result that the original 4,096 sectors dedicated to word space will hold about 153 autocorrelation traces. Since the normal traces may be held in the general area of the external disc storage in packed form, these need never become a limiting factor.

The next step in the process program is to establish the group trace coherence at each reference time $T$. This is done by considering all pairs of a group and combining them in some manner. There may be any number of such pairs and the lower numbered trace will supply the time reference. Thus, with all the CRCO values calculated, the group coherence may be defined simply as the average of the trace-to-trace coherence. Thus, $$V_m^n(T) = n \frac{2}{(n-1)} \sum_{i=m}^{n} \sum_{j=i+1}^{n} C_{ij}(T) \frac{2}{n(n-1)}$$

This is a conservative way of computing the coherence since a single "dead" trace can only effect a minimum number of the total pairs such that its maximum effect will be to reduce the coherence of the group by a factor less than 0.333. Under different circumstances, where there is no possibility of a bad trace, except for geological cause, one might be tempted to use the geometrical mean of the individual trace-to-trace coherence as the group coherence.

Figure 5:
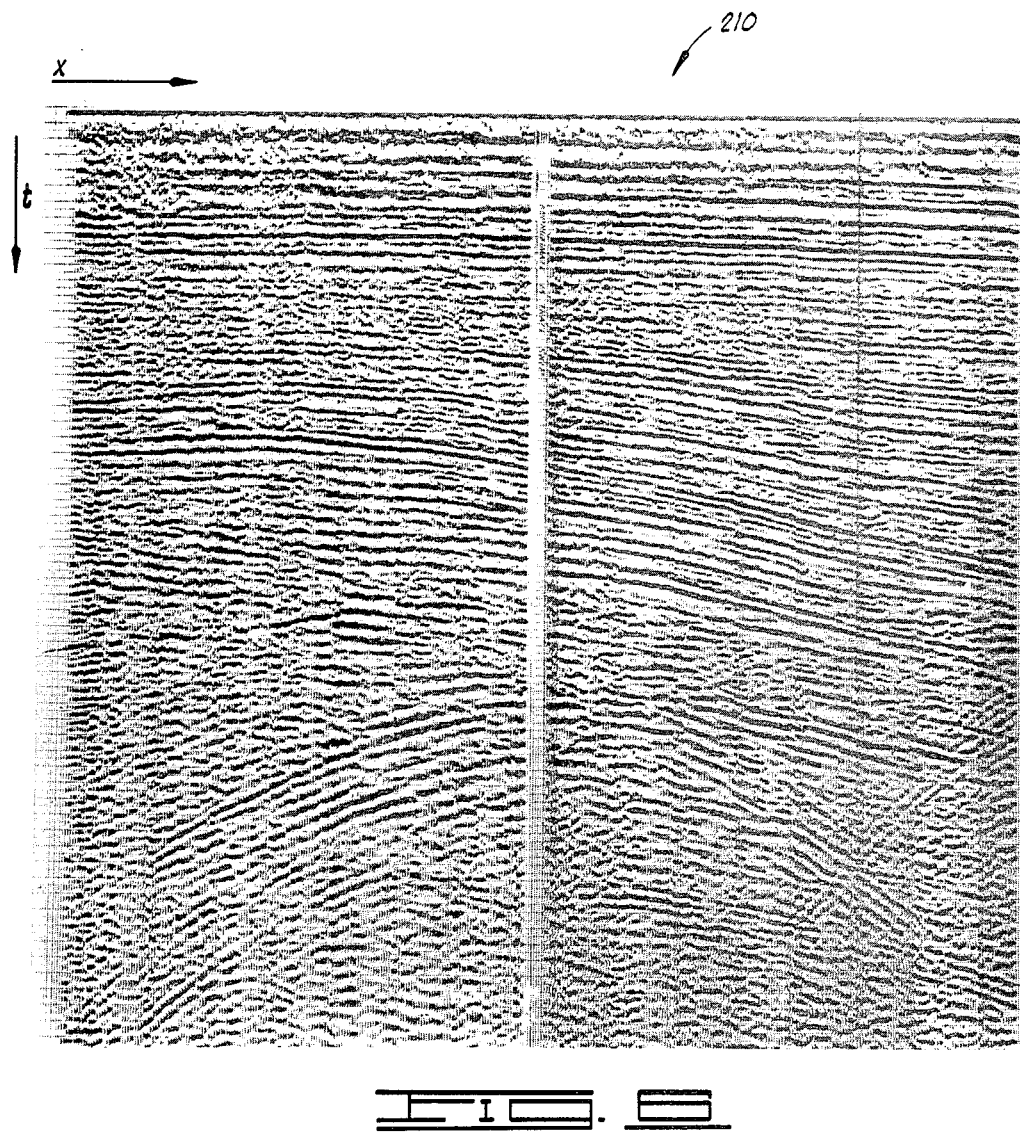
FIG. 5 is a data processing flow diagram illustrating a process program with subroutines for carrying out the method of the invention.

FIG. 5 illustrates in flow diagram form a program 140 for carrying out the method of the invention by automatic digital processing. The process begins at start stage 142 with initialization of the various data acceptance points. An input stage 144 then performs input of the seismic trace values with application to a predefined process stage 146. The predefined process stage 146 performs calculation of autocorrelation for each possible time window and the results are then stored at accessible disc location.

Output flow from the predefined process stage 146 then proceeds to a decision stage 148 which tests to see if all traces have been processed to this point. If all traces have not been processed, routing is via loop 150 for re-input of all data to the input stage 144 for re-computation to pick up additional trace information. If decision stage 148 indicates that all traces have been input and processed, data flow proceeds to an input stage 152 which calls for input of a group of $n$ seismic traces, i.e., a selected trace group.

A processing stage 154 serves to select a pair of n seismic traces for processing in process stage 156 which initializes the cross-correlation window limits relevant to the selected traces. A next processing stage 158 serves to initialize a delay time $\tau$ and to store data for the maximum $C_{ij}$ data flow from process stage 158 and proceeds to a predefined process stage 160 which effects calculation of the cross-correlation coefficient in accordance with the equation as set forth at equations No. (7) and No. (8) above.

Output from predefined process stage 160 then applies data to a decision stage 162 which checks the data to determine if present values are greater than previous $C_{ij}$. If the decision is null, a return loop 164 returns through a process stage 166 to adjust the increment of $\tau$ for re-cycling of data through the predefined process stage 160. If decision stage 162 proves affirmative, data is applied out to a storage stage 168 which serves to store data indicating the maximum $C_{ij}$ in the particular data trace array.

Data from storage stage 168 is then applied through a decision stage 170 to determine if all time windows of interest have been processed. If not, a data loop 172 causes a check through process stage 174 to increment the time window boundaries, and data is applied on re-cycle loop 176 for return through processing stage 158, the stage for initialization of delay time $\tau$ in storage for maximum $C_{ij}$. If decision stage 170 proves affirmative, data proceeds to a next following decision stage 178 to test for whether or not all trace pairs for the selected trace group have been processed. If the answer is negative, a data loop 180 proceeds through a processing stage 182 to revise the pairs relationship and recycle data via loop 184 for input to the process stage 156. Affirmative tests from decision stage 178 allow data flow to a next predefined process stage 186 which serves to calculate the group coherence for all time windows.

Data from predefined process stage 186 is then applied to a next predefined process stage 188 which performs calculation of the gain function from the group coherence data, thereafter to apply such group coherence data to the appropriate trace or traces as represented in related data form. The trace corrected data from predefined process stage 188 is then applied to an output stage 190 which serves to output the revised trace or traces data in selected output form, i.e., any of many output representations, written or pictorial. The output data is then tested through a decision stage 192 to determine that all trace groups are processed and, if not, a recycle loop 194 effects group revision through a process stage 196 and data loop 198 as re-input to the trace pairs selection processing stage 154. If decision stage 192 answers affirmative, the process is stopped as indicated by the designated stop stage 200.

Figure 7:
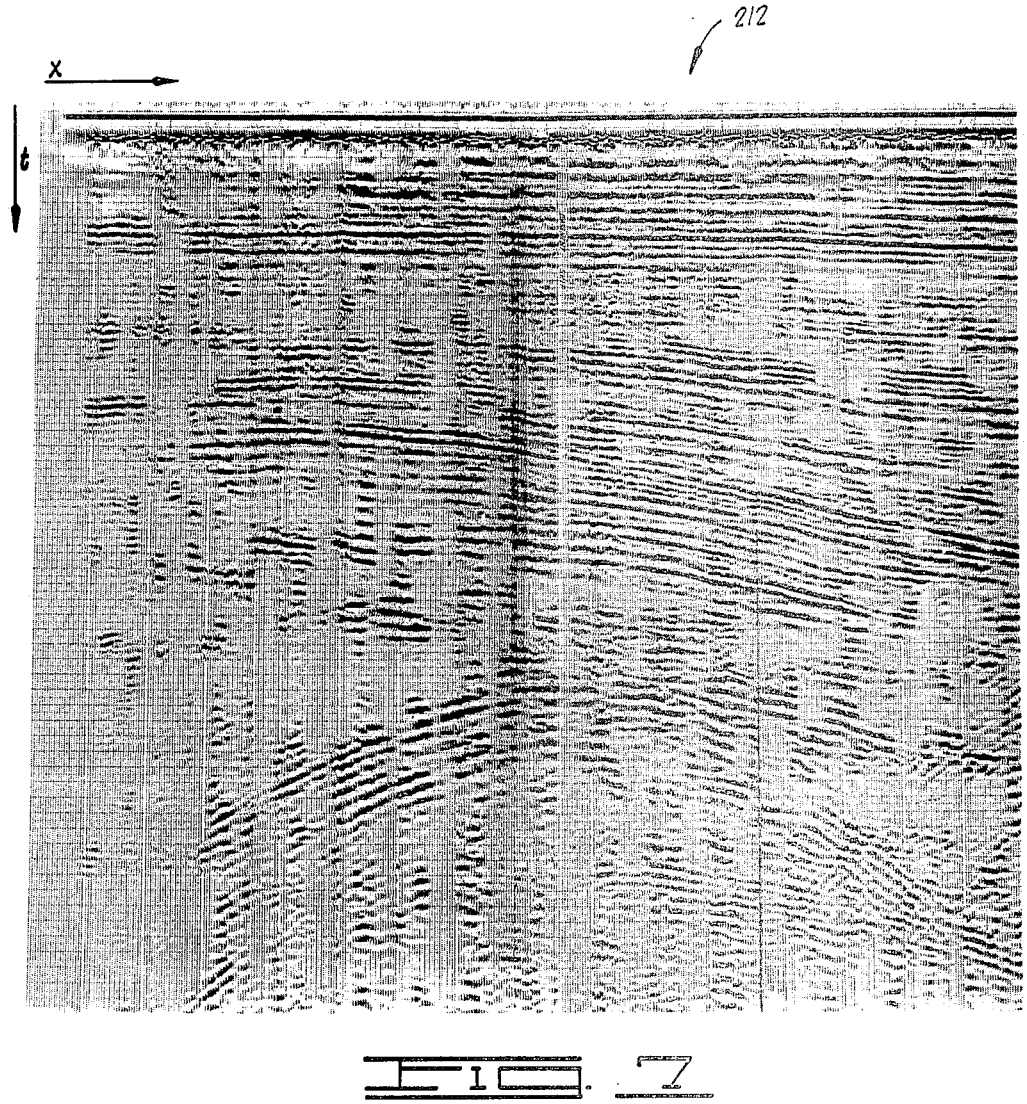
FIG. 7 represents a seismic trace cross-section after having been processed in accordance with the method of the invention.

FIGS. 6 and 7 illustrate a signal enhancement result as obtained utilizing the present invention. The examples of FIGS. 6 and 7 were obtained by digital processing whereby the trace-to-trace coherences were measured and combined into a group coherence, and thus a gain function as a function of time for each trace representative of the group. Thus, FIG. 6 illustrates a seismogram 210 in uncorrected form which was taken along a line known to be one side of a sub-surface dome structure. The strongly arched seismic event is believed to be reflection from the dome structure, which is located off to one side of the surface line $x$. However, noting the FIG. 7 representation or seismogram 212 as output with the benefit of the present signal processing method, much incoherent data is further ordered to provide a different indication, i.e., a line-up of poor coherence data not strongly suggests faulting. It may be noted on FIG. 7 that there is an indication of faulting at a point which crosses what appears to be a strong reflection on the original data. As the overall amplitude of this event is reduced by the coherence consideration, it become evident that there is probably a displacement, up to the right, which is in agreement with the displacement of lower formation near this same fault. Due to the limited resolution of the lower frequencies used, strong reflections have merged together and have given the appearance of continuity.

A digital computer program designed to carry out the method of the invention may be such as one or more Fortran IV subroutines utilizing program parameters and symbols as set forth hereinbelow. Thus, the input parameter card may be split up into four column integer fields as follows:

| Columns: | | |
|---|---|---|
| 1-4 | NTRACE | Number of consecutive seismic traces to be processed. |
| 5-8 | NPOINT | Number of amplitude values per trace. |
| 9-12 | NDIP | Number of separate dips to be considered. (It must be an odd number and the dips will be evenly divided above and below zero.) |
| 13-16 | NRES | Number of traces which form a group for group coherence consideration. 6 has been used, and is the only one checked. 6 is also maximum. |
| 17-20 | NWIND | Number of digital points forming the cross-correlation window (must be odd). |
| 21-24 | ISCF | Is a number used for scaling the products during correlation so that no overflow will result. It is related to NWIND in that a design criterion should be that NWIND should be less than $2^{ISCF}$. For NWIND-51, we have used ISCF=6. |
| 25-28 | IINT | This integer value determines the shift on the cross-section between successive determinations of maximum cross-correlation value and, hence, the gain function. It is important that it be an *even* number. 10 is the value used and tested. The time interval shift for successive gain value is, therefore, IINT $\times$ digital interval in seconds. |
| 29-32 | NWT | It is possible, in this program, to weight the cross-correlations according to dip. If there is no weighting desired and all are equally probably, then NWT=0. If NWT is not zero, then the program looks for the weighting factors on a card (or cards) with format 20F4.3 and NWT values will be read. Usually, if this option is used, NWT will be equal to NDIP. |

The symbols utilized in effecting the present program are:

AUT—Integer array to hold 6036 (4traces and headers) of autocorrelation values.
COGAIN—Real array holding 150 floating point values of the coherence gain to be applied to a trace.
CRCO—Crosscorrelation coefficient array of 2250 floating point numbers (15 × 150).
CRT—Temporary floating point value of crosscorrelation coefficient.
CT—Subroutine name.
DENOM—Temporary denominator F.P.
DIP—Integer array (15 × 150) holding delay values for maximum crosscorrelation coefficients between pairs of traces.
DWP—Real array (201 values) of weighting coefficients for dip in determining cross-correlation.
FAUT—Temporary F.P. while of autocorrelation.
FLAG—Integer returned by TRIN and TROT subroutines to test for correct transmission FLAG = 0 is correct.
GAIN—Real array for expanded gain (3018 values F.P.)
HEAD 1—Integer array of 9 words to hold "header" of trace brought in from RAD (trace 1).
HEAD 2—Integer array of 9 words to hold header of trace 2 brought in from RAD.
IAUT—Index of autocorrelation trace on RAD (negative).
IDP—Temporary test value of DIP.
IERR—Interval test program for TRIN.
IFG—Test integer for CFE to test for error, finish or not finished.
IFIN—Temporary calculation value (integer).
IFRAC—Temporary calculation value (integer).
IINT—Integer input parameter describing the number if digital trace intervals between successive determinations of crosscorrelation coefficients.
IN1—Array (integer) of 1500 values for input trace 1.
IN2—Array (integer) of 1500 values for input trace 2.
INAUT—Temporary autocorrelation trace index on RAD (negative).
INIT—Temporary integer calculation value.
IRES—Integer giving number of traces in group = 1.
ISCF—Integer scaling factor used in convolver subroutine. Sum of products is scaled down by $2^{ISCF}$.
IST—Trace number of RAD.
ISTR—Column number in the CRCO and DIP matrices.
ITEM—Integer array of 102 values used to store output of cross-correlation convolver routine.
ITEST—Integer value used to test trace number in reading tape for additional gain information.
IYE—I + 1 in one loop.
JAUT—Temporary autocorrelation trace index on RAD (negative).
JAY—J in calling sequence of subroutine.
JEND—Integer value corresponding to I − 1 and used as terminal value of DO loop.
JFIN—Temporary integer calculation value.
JNIT—Temporary integer calculation value.
JSEC—Integer value = I + 1 − NRES used as beginning of DO loop.
JSTO1—Integer storage value used in autocorrelation CFE routine for odd numbered storage.
JSTO2—Same as above, but used as even numbered storage.
JTESF—An integer used as end of a DO loop.
KAY—Negative even integer used for storage of autocorrelations on the RAD.
KD—Temporary integer variable.
KPAR—An integer used in calling sequence of CFE to determine whether it starts for Trace 1 in even or odd part of word.
KSTAR—Temporary integer value.
KSTARI—Temporary integer variable.
KTEST—Temporary integer variable.
KWD—Integer returned by CPY12 or (CPY21) for control.
KWDE—KWD + 1.
KWST—Integer calculated and used in even/odd calculations.
LD—Temporary integer variable.
LPAR—An integer used in calling sequence of CFE to determine whether it starts for Trace 2 in even or odd part of word.
LSTPT—Limit use in loops to determine last calculation time.
LWST—Determines whether odd or even half word used in convolver routine.
LX—Intermediate integer calculated value.
MAXDIP—Limit used to determine maximum dip in loops.
MDIP—Number of dips above (or below) horizontal = (NDIP − 1)/2.
MEM—Time index for storing crosscorrelations and dips.
MEND—Total number of time positions for which calculations are made.
MINDIP—Limit used to determine minimum dip in loops.
MINIT—Limit used in loops to determine first calculation time.
MRES—Integer values = NRES − 1.
MW—Number of digital points above (or below) center of window.
NDIP—Total number of dips considered −input parameter.
NEND—Intermediate integer value used as beginning of DO loop.
NFIN—Intermediate integer value.
NP—Integer equal to half number of points per trace (calculated).
NPOINT—Number of points per trace−input parameter.
NRES—Number of traces per group—to input parameter.
NSTA—Intermediate integer value.
NSTR—Intermediate integer calculated value used in storage.
NTRACE—Number of traces in section − input parameter.
NUM—Real number representing a numerator intermediate value.
NW—NWIND − 1.

NWIND—Number of digital values in the "window" used.

NWT—Input integer parameter determining whether weighting used for cross-correlation or not.

SVTRWD—Integer location to save number of words reserved on RAD for each trace.

TCRCO—Real array for 150 values to hold temporary cross-correlation values.

TEMCRO—Real number which is temporary maximum of cross-correlation coefficients as function of dip.

TEMP—Real array of 102 values used for temporary storage of cross-correlation values.

TRWDS—Integer used in CONDESS executive to govern the number of words of storage used per trace.

The foregoing discloses novel seismic signal processing teachings which enable derivation of meaningful indicia from seismic signal patterns which otherwise appear to be random and of no consequence or subject to masking over by spurious signal or noise return. The method of the invention may be carried out by using any number of analog equipment combinations to derive the desired group coherence factor; or, as is most readily employed today, the method may be performed by machine process using such as the general purpose or specialized digital computer equipments.

Changes may be made in the combination and arrangement of elements or steps as heretofore set forth in this specification and shown in the drawings; it being understood, that changes may be made in the embodiments disclosed without departing from the spirit and scope of the invention as defined in the following claims.

What is claimed is:

1. A method for seismic signal processing of plural seismic trace inputs in relation to a time-varying coherence factor signal indicative of the degree of trace coherence along the length of said seismic traces, comprising the steps of:
   varying the time relationship of a selected trace pair of said seismic trace inputs to derive plural signal outputs having selectively different time delay per trace relationship;
   combining each of said selected trace pair signal outputs to provide a respective integrated output;
   receiving all of said integrated signal outputs to provide a maximum voltage output;
   repeating the steps of varying the time relationship, combining and receiving integrated signal outputs for each of a number of different trace pairs selected from said plural seismic trace inputs and providing a respective maximum voltage output;
   combining all of said maximum voltage output signals to provide a time-varying coherence factor signal output; and
   controlling the amplitude versus time characteristic of selected seismic traces of said seismic trace inputs in accordance with said coherence factor signal output.

2. A method as set forth in claim 1 which is further characterized in that:
   each one of all different trace pairs of said seismic trace inputs is processed to derive a respective maximum voltage input.

3. A method as set forth in claim 1 wherein:
   said selected seismic trace is amplified and the amplification gain control is controlled in direct proportion to said coherence factor signal output.

4. A method as set forth in claim 1 wherein said step of combining each of said selected trace pair signal outputs comprises:
   summing said trace pair signal outputs continuously to provide a time-varying summation signal; and
   multiplying and integrating said summation signal over a predetermined time length to generate said integrated output.

5. In a method for automated processing of plural traces of seismic data through electronic digital data processing to derive a time-varying coherence factor signal for controlling selected trace amplitude versus time characteristics, a programmed process comprising:
   inputting data representing a plurality of traces of plural seismic trace information;
   deriving autocorrelation data for each of a plurality of different possible time windows relative to the plural seismic trace inputs;
   setting the cross-correlation time window limits;
   selecting one trace pair of said plural seismic traces, thereafter to derive data for plural cross-correlation coefficients for the selected seismic trace pair as derived at each of successive different trace delay relationships within said time window limits;
   deriving a maximum data indication from said cross-correlation coefficients for each successive time window, which maximum coefficient represents a gain function that is continually indicative of the plural seismic trace group coherence;
   repeating the steps of selecting and deriving cross-correlation coefficients for each of plural different trace pairs; and
   combining data for cross-correlation coefficients as derived for each trace pair to compile a time-varying gain function representative of trace group coherence.

6. In a method for automated processing as set forth in claim 5, the further step comprising:
   selecting seismic trace data for a predetermined trace; and
   controlling output indication of said predetermined trace as a function of time in accordance with said time-varying gain function.

7. In a method as set forth in claim 6, the further automated processing steps wherein:
   said step of repeating the steps of selecting and deriving is effected so that cross-correlation data is derived for all possible trace pairs of the plural seismic trace inputs.

8. In a method as set forth in claim 5, the steps of repeating and combining data comprising:
   calculation of group coherence data for all time windows and all trace pairs; and
   calculation of gain function from said group coherence data.

* * * * *